United States Patent Office 3,216,573
Patented Nov. 9, 1965

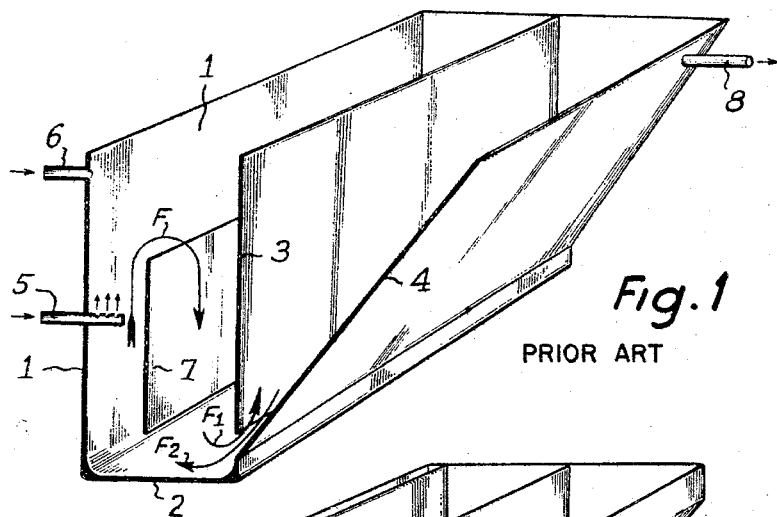
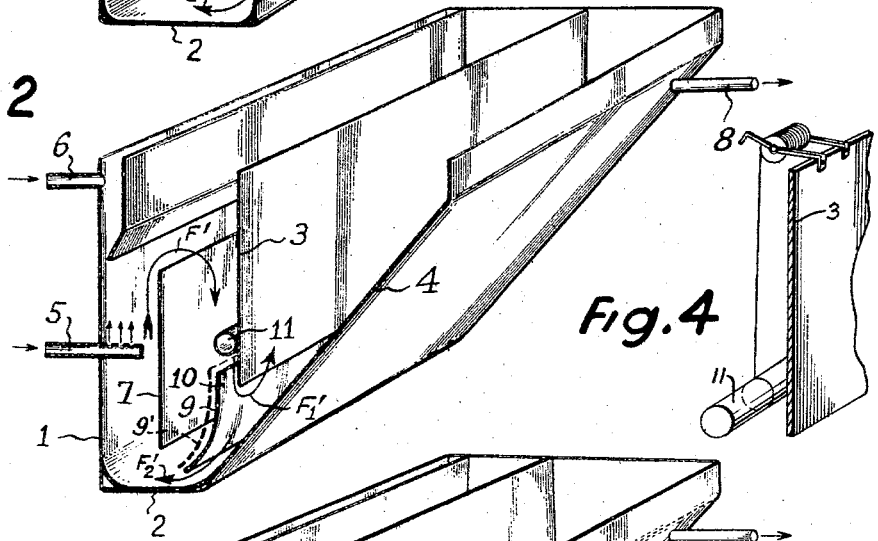
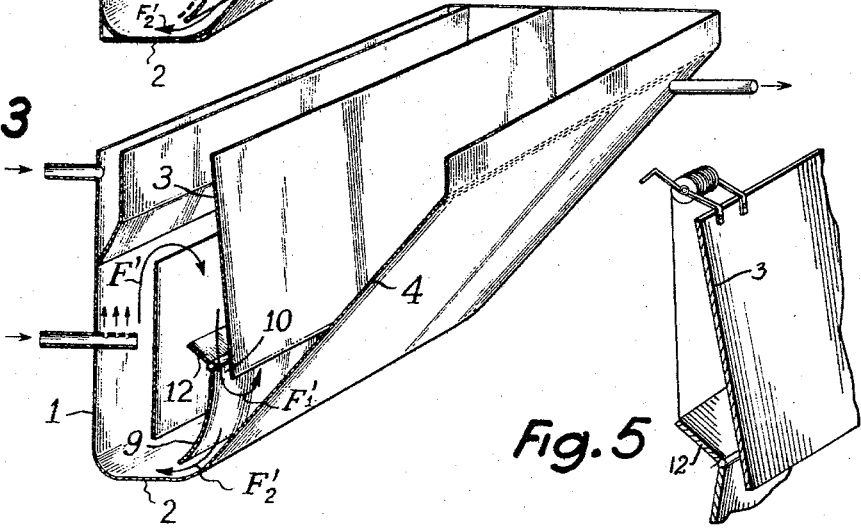
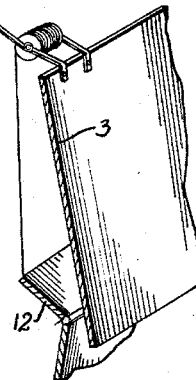

3,216,573
WATER PURIFYING PLANT
René Irion, Neuilly-sur-Seine, France, assignor to Societe Auxiliaire des Distributions d'Eau, Paris, France, a society of France
Filed Dec. 12, 1961, Ser. No. 158,850
Claims priority, application France, Dec. 13, 1960, 846,719, Patent 1,282,625; June 21, 1961, 865,562
5 Claims. (Cl. 210—220)

This invention relates to water purifying processes and apparatus therefor of the type in which there is admixed with the water to be purified a certain proportion of a sedimentation agent comprising aerobic microorganisms which have the property of collecting impurities contaminating the water whereby said impurities will settle out of the water together with the agent itself by sedimentation.

Purifying plants for performing such a process comprise a trough-like tank which is divided by an intermediate partition into an aerating tank section and a sedimentation tank section, the two sections communicating by a bottom passage at the base of the partition. The water to be purified is delivered into the aerating tank section and air is injected into said section in order to develop the growth of the microorganisms comprising the sedimentation agent contained in the tank and also to improve the mixture and aerate the water. The opposite wall of the tank on the sedimentation side is usually slanting, and the sediments which include both the organic agent and the impurity content of the water collected by said agent, settle along the slanting wall into the tank bottom, so that purified water is available and is drawn out from the top of the sedimentation tank section.

Certain difficulties have been encountered in the practical performance of water purifying processes in such a plant. A smooth circulation of aerated water from the aerating section into the sedimentation tank section and of sediment from the sedimentation into the aerating section has been difficult to achieve through the common passage provided at the base of the partition. The sediments tend to build up and prevent circulation of aerated water and sediment, thereby impairing the continuity of the process. Moreover, no effective means has heretofore been provided for controlling the rate of circulation as may be required to deal with batches of water containing varying amounts of contaminant impurities of varying character.

It is an object of the invention to eliminate the above difficulties and to provide an improved water purifying plant of the specified type which will be capable of longer periods of efficient continuous operation without shutdown for cleaning sediment.

It is a further object of the invention to provide such plant in which provision is made for an effective control of the flow conditions through the tank in accordance with the impurity characteristics of the water being treated at any given time. Thus, in accordance with the broad objects of the invention it is desired to improve the economy of water purifying processes of the type indicated. More specific objects will be pointed out in the specific description.

Exemplary embodiments of the invention will now be described for purposes of illustration but not of limitation with reference to the accompanying drawings, wherein:

FIG. 1 is a simplified perspective view of a trough-like water purifying tank of a conventional type used at present, and over which the present invention is an improvement, FIG. 2 is a similar view of one form of improved water purifying tank according to the invention, FIG. 3 is a similar view of a modified form of tank according to the invention, and FIGS. 4 and 5 show, in simplified perspective, means for controlling various elements in the water purifying tank.

The generally conventional water purifying apparatus diagrammatically shown in FIG. 1 is in the form of an elongated trough of generally trapezoidal shape in cross section including a horizontal bottom wall 2, a vertical side wall 1 and a slanting opposite side wall 4. A vertical partition wall 3 is provided in the trough substantially overlying that end of bottom wall 2 from which the slanting side wall 4 extends. The partition 3 does not extend the full way down to the bottom so as to provide a bottom communication between the two spaces defined by said partition 3.

The space defined between the vertical side wall 1 and partition 3 constitutes an aerating tank section while the space between partition 3 and the slanting side wall 4 provides a sedimentation tank section. An inlet 6 for water to be treated connects with the top of the aerating tank section through side wall 1, and an outlet 8 for the pure water leads from the top of the sedimentation tank section through side wall 4, preferably at a point horizontally spaced from the inlet along the length of the tank. One or more inlets 5 for compressed air are connected with the vertical side wall 1 at an intermediate elevation. Usually, as shown, there is provided within the aerating tank section a vertical deflector or baffle plate 7 for increasing the length of the flowpath of the water therethrough.

A charge of suitable activated sedimenting agent is placed in the tank. The inlet water, charged with activated agent and then with air from the air inlet 5, rises in the aerating tank section and generally follows the path indicated by arrow F over the baffle 7, then down the opposite side of said baffle and passes as indicated by arrow F1 through the communication between the tank sections below the partition 3, and thus into the sedimentation tank section. Sedimentation agent settling out of the water as it rises through the sedimentation tank section drops back along the slanting side wall 4 into the bottom of the aeration tank as shown by arrow F2. The active agent settling out of the water in the sedimentation tank section carries with it a major proportion of the impurities contaminating the input water, and the output water derived from outlet 8 is substantially clean.

In the operation of such an apparatus it has been found that turbulence and eddies occur in the communicating space between the two tank sections under the partition 3, due to the reverse flow occuring through said space, i.e. the upward flowing water indicated by arrow F1, and the down-flowing sediment indicated by arrow F2. This turbulence interferes with the smooth operation of the system and frequently results in an accumulation of sludge on the slanting side wall of the sedimentation tank section and a poor and/or intermittent circulation of the water. In an attempt to remove this defect, it has been suggested to provide an additional communication space between the two tank sections through the partition separating them, at a point spaced above the bottom communication space. However, experience has shown that tanks constructed on these lines lack effectiveness in that a short-circuit or by-pass effect is present which detracts from the full effectiveness of the purifying treatment. A generally similar difficulty arises in arrangements wherein the water from the aerating section into the sedimentation section flows over an adjustable weir positioned in the upper section of the tank while the sediments flow back into the aerating tank section along a bottom path is above described.

In addition to the above mentioned deficiencies of the prior-art apparatus some representative examples of which have just been referred to, none of these prior arrangements to the applicant's knowledge discloses any provision for effectively controlling the rate of flow and sedimentation, apart from providing a septum in the sedimentation tank section for reducing the turbulence that would otherwise be introduced thereinto by the flow of water over the weir. This provision does not materially modify the very slow rate of fall-out of the sediments in the sedimentation tank section.

It is an object of this invention to provide improved means for effectively increasing the rate of sedimentation fall-out without detracting from the efficiency of the purifying treatment. Another object is to provide simple and efficient means for regulating the water flow from the aerating tank section into the sedimentation tank section.

Referring to FIG. 2 of the drawings, an improved water purifying tank according to the invention is there shown, the general shape of which is similar to that of the tank shown in FIG. 1, and similar references have been used to designate corresponding parts in both figures. It is noted that while the partition 3 has been shown vertical in FIG. 2 as in FIG. 1, this is not necessarily so and it may be inclined in either direction if desired.

In accordance with the invention, a deflector or baffle plate 9 is positioned in the aerating tank section adjacent to but spaced from the elongated opening between the tank sections. The upper horizontal edge of the baffle 9 is at an elevation somewhat higher than the lower edge of partition 3. As shown, the baffle 9 is somewhat arched with its concavity directed towards the aeration tank section, but this is not essential. The upper edge of the baffle 9 defines with the bottom edge of partition 3 an upper passage 10 for the flow of water from the aerating tank section into the sedimentation tank section. The upper passage 10 extends generally vertically as shown in FIG. 2.

Owing to the provision of the baffle 9 the water flow along the path F' through the aerating tank section is partly deflected into the sedimentation section so as to follow the flowpath generally shown at F'1. It is found that with this arrangement the sediments flowing out of the sedimentation section as shown by the arrows F'2 do not tend to induce eddies and that a smooth, continuous flow of water and sediments in reverse directions now occurs through the common communication space below the partition 3. Apparently, the flow of water along the path F'1, that is through the relatively narrow space defined between the upper part of the baffle 9 and the lower part of partition 3, creates a Venturi-like section effect which improves the smooth flow of the sediments along the surface of the slanting side wall 4. However that may be, experience shows that the smooth circulation of water and sediments in opposite directions between the two tank sections is greatly enhanced by the provision of a baffle 9 of the kind described positioned as shown.

Means are provided for controlling the portion of the total water flow which is passed through the upper space 10. The said means, in the embodiment shown in FIG. 2 is provided by a movable further baffle positioned at a variable elevation above the space 10. Conveniently, the movable baffle is provided in the form of a straight length of piping 11, which may be positioned substantially in engagement with the surface of partition 3, and any suitable means may be provided for adjusting the vertical position thereof. The simplest form F means is shown in FIG. 4. Such means is well known in the art (see U.S. Patent 2,989,186) and its construction forms no part of the invention. Thus by increasing or decreasing the elevation of pipe 11 above the passage 10, the proportion of water flowing through said passage 10 can be increased or decreased.

In the modified embodiment shown in FIG. 3, the general arrangement is the same, including the stationary baffle plate 9 provided next to the partition 3 for defining an upper path of water flow into the sedimentation tank through the passage 10. In this case however, the partition 3 is shown inclined to the vertical towards the sedimentation tank section, an arrangement found convenient when desired to increase the rate of water through-put of the apparatus.

In this instance moreover the adjustable baffle for regulating the proportion of the total water flow passing through the passage 10 is provided in the form of an adjustable flap 12 pivoted to the upper edge part of stationary baffle 9, and controllable in the most simplified manner as shown in FIG. 5. As with the arrangement shown in FIG. 4, the means for controlling the position of flap 12 is well known from U.S. Pat. 2,989,186 and forms no part of the present invention. If desired, the arrangement may be such that for a certain adjusted position of flap 12 (such as the position shown in FIG. 3) all of the water flowing over the baffle 7 along the flowpath indicated by arrow F' is caused to pass through the passage 10.

Various further modifications may be made in the exemplary constructions illustrated and described without exceeding the scope of the invention. Thus if desired to improve the provisions afforded for controlling the water flow, the baffle 9 heretofore described as stationary may be provided adjustable as by being slidable vertically up and down or horizontally in suitable slide ways. Such ways may be substantially normal to the separating partition 3, or they may be substantially vertical. Thus the baffle 9 may be adjustable either by up and down displacement in its own general plane, or by transverse displacement towards and away from the partition 3. Or again, the baffle 9 may be pivotally mounted about a horizontal axis. With such an arrangement the relative proportion of the water flow passing through the upper and lower passageways from the aerating section into the sedimentation section may be controlled without having to provide the further adjustable baffle means as shown at 11 or 12 herein. Yet other modifications may be conceived without departing from the scope of the invention as defined in the appended claims.

What I claim is:

1. In a water purifying plant including a trough-like tank having opposite side walls and a bottom, one of said side walls being vertical, the other being inclined tom, a partition between said side walls, said partition ton, a partition between said side walls, said partition defining with the vertical wall an aerating tank section, said partition defining with the inclined wall a sedimentation tank section, an outlet for purified water being provided in said sedimentation tank section at an upper level therein, an inlet for water to be purified being provided in said aerating tank section at approximately the same level as said outlet, said partition extending above the level of said inlet and outlet and having a lower edge spaced from the bottom of the tank to define therewith a flow passage establishing communication between said tank sections such that water to be purified passes from the aerating tank section to the sedimentation tank section via said flow passage while sediment settling from the water slides downwardly on the inclined side wall and flows to the aerating tank section also via said flow passage, a stationary baffle positioned in said aerating tank section at a location above said bottom and adjacent said partition, said baffle being positioned at a level below the level of the inlet and outlet and having an upper portion with an upper edge at a level above the lower edge of the partition, the baffle being laterally spaced from said partition and having a lower edge spaced from said bottom of the tank to subdivide said flow passage into an upper passage section for the preferential flow of water from the aerating tank section into the sedimentation tank section and a lower passage section for the flow of sediment from the sedimentation tank section into the aerating tank section, said upper portion of the baffle defining with said partition a substantially vertical passage constituting said upper passage section for the flow of water and means operatively associated with said baffle and movable with respect thereto and located proximate the upper passage section for blocking the same in varying amounts for adjusting the effective flow of area of said upper passage section.

2. A water purifying plant as claimed in claim 1 wherein said means for adjusting the effective flow area comprises a vertically adjustable length of piping disposed above said upper passage section.

3. A water purifying plant as claimed in claim 1 wherein said means for adjusting the effective flow area comprises a baffle section pivoted to the upper end of said stationary baffle and adjustable in angular position with respect thereto.

4. A water purifying tank having a bottom wall, a first side wall, a slanting opposite side wall and opposite end walls, a partition in said tank extending above said slanting wall at a location where the latter joins said bottom and having a lower edge spaced from said location to define a communicating passage extending between an aerating tank section between said partition and said first side wall and a sedimentation tank section between said partition and said slanting side wall, water and air inlets providing communication with said aerating tank section and a purified water outlet leading from the sedimentation tank section; said water inlet and outlet being at approximately the same level while the air inlet is located below such level, said partition having an upper edge extending above the level of said water inlet and outlet and a lower edge spaced from said bottom, a first generally vertical baffle positioned in said aerating tank section to define a flowpath for aerated water over said first baffle and towards said communicating passage; said first baffle having an upper edge spaced below the level of said water inlet and outlet and a lower edge spaced above said bottom, and a further baffle positioned in said aerating tank section between the partition and said first baffle, said further baffle being spaced from said partition in a direction towards said first baffle and including upper portion with an upper edge extending parallel to and adjacent the partition at a level above the lower edge of the partition to define a substantially vertical upper passage section for the flow of water from the aerating tank section to the sedimentation tank section, said further baffle having a lower edge spaced from said bottom to define therewith a lower passage section for the flow of sediment from the sedimentation tank section into the aerating tank section, and means operatively associated with said further baffle and movable with respect thereto and located proximate the upper passage section for blocking the same in varying amounts for adjusting the effective flow area of said upper passage section.

5. A water purifying plant as claimed in claim 4 wherein said further baffle includes a portion with a convex curvature facing said sedimentation tank section.

References Cited by the Examiner

UNITED STATES PATENTS

| 372,216 | 10/87 | Gaillet | 210—305 |
| 2,574,685 | 11/51 | Baxter et al. | 210—220 X |
| 2,989,186 | 6/61 | Weis | 210—221 X |
| 3,015,396 | 1/62 | Quast | 210—221 |
| 3,133,017 | 5/64 | Lambeth | 210—221 X |

FOREIGN PATENTS 418,319  9/25  Germany.

REUBEN FRIEDMAN, *Primary Examiner.*

GEORGE D. MITCHELL, *Examiner.*